United States Patent Office 3,776,860
Patented Dec. 4, 1973

3,776,860
REFORMING CATALYST
Charanjit Rai, Somerset, N.J., assignor to Cities Service Oil Company, Tulsa, Okla.
No Drawing. Filed July 30, 1971, Ser. No. 167,760
Int. Cl. B01j *11/12*
U.S. Cl. 252—455 R                    6 Claims

ABSTRACT OF THE DISCLOSURE

An improved reforming catalyst is disclosed comprising an alumina support impregnated with platinum, rhenium and a rare earth metal. Preferably the catalyst composition comprises platinum, rhenium and rare earth metals such as neodymium (Nd), praseodymium (Pr), samarium (Sm) and ytterbium (Yb) each in amounts of from 0.1% to 5% weight.

BACKGROUND OF THE INVENTION

This invention is directed to a heterogeneous catalyst for use in the refining of hydrocarbon oils. More particularly this invention deals with a heterogeneous catalyst suitable for use as a reforming catalyst.

With the introduction of low lead and unleaded gasolines into the marketplace, it has become necessary to produce a higher octane gasoline to compensate for the loss of octane improvement represented by the lead additives. One of the modes employed by refiners to improve gasoline octane ratings has been to increase the amount of high octane compounds present in the final gasoline blend. Among the methods employed for increasing the amount of high octane hydrocarbons is catalytic reforming.

In catalytic reforming the principal object is to convert low octane hydrocarbons to aromatic hydrocarbons. The most successful heterogeneous catalysts for this purpose are platinum catalysts on a gamma alumina support. According to R. J. Hengstebeck in "Petroleum Processing" (McGraw-Hill, 1959), the mechanism of such catalysts appears to be dual functional, that is, the platinum acts as a dehydrogenating promoter, while the acidic material such as the alumina promotes isomerization. In commercial catalysts enough platinum is used to ensure that the dehydrogenation activity is much greater than the isomerization activity. An ideal catalyst would convert all other hydrocarbons in reforming selectively to aromatics rapidly with only a small catalyst activity. Such a catalyst would not promote hydrocracking nor would it have to operate under conditions unfavorable to the production of aromatics. Deviations may be either in the selectivity of the catalysts toward the production of aromatics or in the activity of the catalyst for the several reactions that occur. Selectivity is determined by the relative rates of competing reactions. Activity is determined by the magnitude of the rate constants. Platinum catalysts have proved to be the most selective and active for reforming.

Certain commercial reforming catalysts now employed comprise minor amounts of platinum and rhenium on an alumina support, and it is the object of the present invention to provide a novel catalyst which would improve or enhance the reforming catalyst activity of the platinum, rhenium catalyst. U.S. Pat. No. 3,415,737 issued Dec. 10, 1968 to H. E. Kluksdahl is particularly illustrative of such a reforming catalyst.

SUMMARY OF THE INVENTION

My invention is directed to a reforming catalyst comprising minor amounts of platinum, and minor amounts of a rare earth metal on a suitable support. More specifically the reforming catalyst composition comprises a gamma alumina support impregnated with platinum, rhenium, and a rare earth metal selected from the group consisting of neodymium (Nd), praseodymium (Pr), samarium (Sm), ytterbium (Yb), all in amounts of up to 5% wt.

DESCRIPTION OF THE PREFERRED EMBODIMENT

Briefly my invention is a novel heterogeneous reforming catalyst employing a rare earth metal as a cocatalyst in combination with platinum, both in minor proportion on a suitably porous eta or gamma alumina support. Preferably rhenium is also included in minor amounts in the catalyst as a cocatalyst. The rare earth metals which are preferably incorporated in the catalyst are either neodymium or praseodymium referred to hereinafter as Nd and Pr respectively. While Nd or Pr are the preferred rare earth metals, the use of samarium (Sm) and ytterbium (Yb) is also contemplated as being within the purview of the invention. Accordingly the reforming catalyst of the invention comprises platinum, in the amount of from 0.1 to about 3.0% by weight of the catalyst composition, although amounts of up to 5.0% by weight may be used. Similarly the rhenium may be incorporated in the catalyst in the amount of from about 0.1% to about 5.0% by weight. A rare earth metal such as Nd, Pr, Sm or Yb is also employed in the catalyst as either the metal, oxide or chloride in the amount of from 0.1% to 3.0% by weight of the composition. In addition chloride is included in the catalyst in the amount of from 0.1% to about 3.0% weight.

A very successful reforming catalyst is disclosed in the aforementioned U.S. Pat. No. 3,415,737. Briefly the prior art catalyst disclosed by this patent is a catalyst composition of a porous solid catalyst support and 0.1 to 3% wt. platinum and 0.01 to 5% wt. rhenium. This catalyst, like the catalyst described herein, is used in catalytic reforming of a sulfur-free naphtha. It is my discovery that certain of the rare earth metals when used in combination with rhenium appear to enhance conversion rate and selectivity in certain of the functions of a bimetallic reforming catalyst. Accordingly my invention is basically the catalyst defined by the aforementioned U.S. Pat. No. 3,415,737 in combination with a rare earth metal, as a cocatalyst.

More particularly, my catalyst composition comprises a platinum, rhenium, rare earth metal in amounts of from about 0.1% to 5% wt. on a solid porous support. As previously discussed the preferred rare earth metals are neodymium and praseodymium, but samarium and ytterbium are also viewed as suitable. The preferred combination of cocatalysts are generally in the ratio of 2 parts platinum to 1 part each of rhenium and the rare earth metal, although the rare earth metal may easily be in twice the amount by weight as either the platinum or rhenium cocatalysts.

The major proportion of the catalyst is generally denominated as the support, and is a porous material composed of alumina, silica or mixtures thereof. Preferably the catalyst support is alumina, particularly the gamma alumina form which is presently the preferred support for conventional reforming catalysts. Such a catalyst support may be prepared by any known conventional process. For instance, the alumina support may be prepared by alkalyzing a solution of an acid-acting water soluble aluminium salt such as aluminum chloride after which is generally a gel or hydrate is mulled, pelleted and cake mulled if desired. Inert binders or lubricants may be added as is known to the art. The precipitated alumina which is generally a gel of hydrate is mulled, pelleted and calcined to obtain the form of alumina support desired, preferably the gamma alumina form though eta alumina is also appropriate as a support. Other methods of preparing gamma alumina may be used and are well known.

The cocatalyst metals of the catalyst according to the present invention are combined with the support in a conventional manner as by immersing the alumina support in solutions of the cocatalyst after which the impregnated support is dried and further calcined in air or other gases to produce the catalyst.

Preferably the catalyst of this invention is prepared by impregnating a commercially available reforming catalyst support of gamma alumina via the minimum solution method with a mixture of dissolved salts or other compounds, i.e., the solution volume is equal to the absorption capacity of the alumina support. Thus impregnation may be with an aqueous solution of chloroplatinic acid, rhenium and the salt of either praseodymium or neodymium. The halogen may be included in some other manner if other salts of the aforementioned cocatalysts are used.

EXAMPLE 1

A catalyst is prepared by impregnating gamma alumina spheroid supports with a solution of chloroplatinic acid ($H_2PtCl_6$), rhenium heptoxide ($Re_2O_7$) and neodymium chloride in the atomic proportions of 30 parts Pt, 35 parts Re and 35 parts Nd (all per hundred). The supported catalyst was dried at 500° C. for 6 hours before use, and resulted in a catalyst comprising about 0.3 Pt, 0.35 Re and 0.35 Nd, all by weight.

EXAMPLE 2

A support and a solution as described in Example 1 above are prepared except that in place of the neodymium chloride, praseodymium chloride is employed in the same proportionate amount. The catalyst composition thus prepared comprises a catalyst similar to that of Example 1 except that the Pr is in place of the Nd.

EXAMPLE 3

Still another composition according to the present invention is produced by adding ammonium hydroxide to a solution of aluminum chloride hexahydrate to obtain an alumina precipitate which is washed first with weak ammonia solution and finally with water. An aqueous solution of chloroplatinic acid, perrhenic acid and samarium chloride in equal atomic amounts by weight of the metals, is added to the alumina. The impregnated alumina composite is then dried at about 570° F. for about 17 hours to obtain a reforming catalyst having equal minor amounts of 0.5% wt. Pt, Re and Sm.

EXAMPLE 4

A support and impregnation solution as described above in Example 3 are prepared except that in place of the samarium salt, ytterbium chloride is used, together with a smaller proportionate amount of chloroplatinic acid, to obtain a catalyst with 0.3% wt. Pt, 0.5% wt. Re, and 0.5% wt. Yb. In addition, all the above described catalysts contain chloride in amounts of up to 3% wt.

Having thus fully described my invention and wishing to cover these modifications and variations which would be apparent to those skilled in the art, but without departing from either the scope and spirit thereof, I claim:

1. A reforming catalyst comprising a major proportion of a porous support and 0.1–5.0% wt. of platinum; 0.1–5.0% wt. of rhenium; and 0.1–5.0% wt. of a rare earth metal or rare earth metal chloride wherein said rare earth is selected from the group consisting of Pr, Nd, Sm, and Yb.

2. The reforming catalyst of claim 1 wherein said porous support is selected from the group consisting of alumina, silica, and mixtures thereof.

3. The reforming catalyst of claim 2 wherein said platinum, said rhenium, and said rare earth metal or rare earth metal chloride are each in the amount of from 0.1% to about 3.0% wt.

4. The reforming catalyst of claim 3 wherein said rare earth metal is Nd.

5. The reforming catalyst of claim 3 wherein said rare earth metal is Pr.

6. The reforming catalyst of claim 4 wherein said support is composed of gamma alumina.

References Cited

UNITED STATES PATENTS

| | | | |
|---|---|---|---|
| 3,402,210 | 9/1968 | Hiser | 252—455 R |
| 3,002,921 | 10/1961 | Gladrow et al. | 252—462 X |
| 3,223,617 | 12/1965 | Maziuk | 252—462 X |
| 3,415,737 | 12/1968 | Kluksdahl | 252—466 Pt |
| 3,431,220 | 3/1969 | Batzold | 252—462 X |

OTHER REFERENCES

Blackham et al.: Rhenium as a Catalyst in Hydrocarbon Reforming Reactions, Ind. Eng. Chem., Prod. Res. Develop., 4(4), 269—273 (1965).

DANIEL E. WYMAN, Primary Examiner

W. J. SHINE, Assistant Examiner

U.S. C. X.R.

208—138; 252—460, 461, 462, 466 Pt

UNITED STATES PATENT OFFICE
CERTIFICATE OF CORRECTION

Patent No. 3,776,860            Dated   December 4, 1973

Inventor(s)         Charanjit Rai

It is certified that error appears in the above-identified patent and that said Letters Patent are hereby corrected as shown below:

Column 2, line 66, the portion reading "is generally a gel or hydrate is mulled, pelleted and" should read - - the resulting precipitate is filtered and the filter - - .

Signed and sealed this 16th day of April 1974.

(SEAL)
Attest:

EDWARD M. FLETCHER, JR.
Attesting Officer

C. MARSHALL DANN
Commissioner of Patents